United States Patent
Ohtomo et al.

(10) Patent No.: US 7,196,302 B2
(45) Date of Patent: Mar. 27, 2007

(54) LASER MEASURING METHOD AND LASER MEASURING SYSTEM HAVING FAN-SHAPED TILTED LASER BEAMS AND THREE KNOWN POINTS OF PHOTODETECTION SYSTEM

(75) Inventors: Fumio Ohtomo, Itabashi-ku (JP); Kazuki Osaragi, Itabashi-ku (JP); Kunihiro Hayashi, Itabashi-ku (JP); Richard W. Davidson, Pleasanton, CA (US); Clyde C. Goad, Pleasanton, CA (US); Vernon J. Brabec, Pleasanton, CA (US); Eduardo F. Falcon, Pleasanton, CA (US); Richard J. Jackson, Pleasanton, CA (US)

(73) Assignee: Kabushiki Kaisha TOPCON, Tokyo-to (JP)

( * ) Notice: Subject to any disclaimer, the term of this patent is extended or adjusted under 35 U.S.C. 154(b) by 215 days.

(21) Appl. No.: 11/070,912

(22) Filed: Mar. 3, 2005

(65) Prior Publication Data

US 2005/0211882 A1    Sep. 29, 2005

(30) Foreign Application Priority Data

Mar. 23, 2004    (JP)    .............................. 2004-085183

(51) Int. Cl.
 *G01C 21/02* (2006.01)
(52) U.S. Cl. .................................. 250/206.2; 250/559.3
(58) Field of Classification Search ............. 250/206.2, 250/559.3, 221, 234–236; 356/139.07–14, 356/142, 145–147; 172/4.5, 5
See application file for complete search history.

(56) References Cited

U.S. PATENT DOCUMENTS 5,100,229 A * 3/1992 Lundberg et al. .......... 356/3.12
6,646,732 B2   11/2003 Ohtomo et al. .......... 356/141.5

FOREIGN PATENT DOCUMENTS

| EP | 1 524 498 | 4/2005 |
| JP | 2002-039755 | 2/2002 |
| JP | 2003-214852 | 7/2003 |
| JP | 2004-212058 | 7/2004 |

* cited by examiner

*Primary Examiner*—Que T. Le
(74) *Attorney, Agent, or Firm*—Nields & Lemack

(57) ABSTRACT

A laser measuring method in a laser measuring system, which comprises a rotary laser system for projecting a laser beam by rotary irradiation and at least one photodetection system having at least one photodetector for receiving the laser beam, comprising a step of emitting at least two fan-shaped laser beams by the rotary laser system, at least one of the fan-shaped laser beams being tilted, a step of receiving the laser beams at least at three known points by the photodetection system, a step of obtaining elevation angles with respect to the rotary laser system based on photodetection signals which are formed when the photodetector receives the laser beam, and a step of measuring an installing position of the rotary laser system based on elevation angles and position data at the three known points.

3 Claims, 9 Drawing Sheets

LIGHT EMISSION CONTROL UNIT

FIG. 14A       FIG. 14B       FIG. 14C       FIG. 14D
   
FIG. 14E       FIG. 14F
 
FIG. 14G       FIG. 14H       FIG. 14I       FIG. 14J
   
FIG. 14K       FIG. 14L       FIG. 14M       FIG. 14N
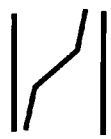   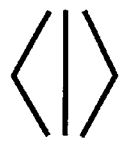
FIG. 14O       FIG. 14P
 
FIG. 14Q       FIG. 14R
 

LASER MEASURING METHOD AND LASER MEASURING SYSTEM HAVING FAN-SHAPED TILTED LASER BEAMS AND THREE KNOWN POINTS OF PHOTODETECTION SYSTEM

BACKGROUND OF THE INVENTION

The present invention relates to a laser measuring method and a laser measuring system, by which a laser beam is projected by rotary irradiation for the purpose of forming a horizontal reference plane or a reference plane tilted with respect to the horizontal reference plane at a predetermined angle and by which it is possible to measure a position by receiving the laser beam.

As a representative system for forming a reference plane by projecting a laser beam by rotary irradiation, a rotary laser system installed at a known point and a photodetection system installed at a measuring point and used for receiving a laser beam from the rotary laser system have been known in the past.

A rotary laser system forms a reference plane by projecting a laser beam with a cross-section of luminous flux in spot-like shape. For instance, when the laser beam is projected in a horizontal plane by rotary irradiation, a horizontal reference plane is formed. When the laser beam is projected within a vertical plane by rotary irradiation, a vertical reference plane is formed. When the laser beam is projected within a tilted plane by rotary irradiation, a tilted reference plane is formed.

The photodetection system comprises a photodetection unit for receiving and detecting a laser beam. Based on the laser beam detected by the photodetection unit, a horizontal reference position, a vertical reference position, etc. are measured.

When measurement as required is performed by projecting a laser beam from a rotary laser system by rotary irradiation, accuracy of installation of the rotary laser system gives direct influence on a measured value. Therefore, it is important to install the rotary laser system at a known point with high accuracy. However, accurate installation requires skill and is difficult to perform. Also, measurement is based on the assumption that the rotary laser system is installed at a known point. Depending on the circumstances, there may be no adequate known point for installing the rotary laser system or there may be environmental condition not suitable for installing the rotary laser system at a known point. In such cases, there has been such problem that measuring operation itself is often difficult to carry out.

When the rotary laser system can be installed, there is no effective method to verify whether the rotary laser system has been accurately installed or not. Further, when the rotary laser system is installed in tilted condition, error may occur with respect to the known point but there has been no effective method to detect such error. Also, when deviation of position occurs due to later cause after the system has been installed, there has been no effective method to detect such deviation.

A laser measuring system is disclosed in JP-A 2002-39755, in which a laser beam is projected by rotary irradiation to form a horizontal reference plane or a reference plane tilted at a predetermined angle with respect to the horizontal reference plane, and by which position can be measured by receiving the laser beam at a photodetection system.

SUMMARY OF THE INVENTION

It is an object of the present invention to provide a laser measuring system, in which a rotary laser system can be installed at any desired point and by which it is possible to perform accurate measurement without being influenced by installing conditions such as tilting of the rotary laser system, and deviation of the rotary laser system can be confirmed and corrected when positional deviation occurs at a later time after the installation.

To attain the above object, the present invention provides a laser measuring method in a rotary laser system, which comprises a rotary laser system for projecting a laser beam by rotary irradiation and at least one photodetection system having at least one photodetector for receiving the laser beam, comprising a step of emitting at least two fan-shaped laser beams by the rotary laser system, at least one of the fan-shaped laser beams being tilted, a step of receiving the laser beams at least at three known points by the photodetection system, a step of obtaining elevation angles with respect to the rotary laser system based on photodetection signals which are formed when the photodetector receives the laser beam, and a step of measuring an installing position of the rotary laser system based on elevation angles and position data at the three known points.

Also, the present invention provides a laser measuring system, which comprises a rotary laser system for projecting a laser beam by rotary irradiation and at least one photodetection system for receiving the laser beam, wherein the rotary laser system has a laser projector for emitting at least two fan-shaped laser beams, at least one of the fan-shaped laser beams being tilted, the photodetection system comprises at least one photodetector for receiving the fan-shaped laser beams, the photodetection system is installed at least at three known points, elevation angles with respect to the rotary laser system are calculated based on photodetection signals which are formed when the photodetector receives the laser beam, and an installing position of the rotary laser system is calculated based on elevation angles and position data at the three known points. Further, the present invention provides the laser measuring system as described above, wherein the photodetection system comprises a GPS position measuring system, and a position of the photodetection system is measured by the GPS position measuring system.

According to the present invention, a laser measuring method is provided, which comprises a rotary laser system for projecting a laser beam by rotary irradiation and at least one photodetection system having at least one photodetector for receiving the laser beam, comprising a step of emitting at least two fan-shaped laser beams by the rotary laser system, at least one of the fan-shaped laser beams being tilted, a step of receiving the laser beams at least at three known points by the photodetection system, a step of obtaining elevation angles with respect to the rotary laser system based on photodetection signals which are formed when the photodetector receives the laser beam, and a step of measuring an installing position of the rotary laser system based on elevation angles and position data at the three known points. As a result, there is no need to install the rotary laser system at a known point. This contributes to the improvement of working efficiency and to the elimination of error, which may occur during installation. Also, when the position of the rotary laser system is deviated after installation, the installing position can be corrected.

BRIEF DESCRIPTION OF THE DRAWINGS

FIG. 14(A)–FIG. 14(R) each represents a configuration of a fan-shaped beam used in the embodiment of the present invention.

DETAILED DESCRIPTION OF THE PREFERRED EMBODIMENT

Figure 1:
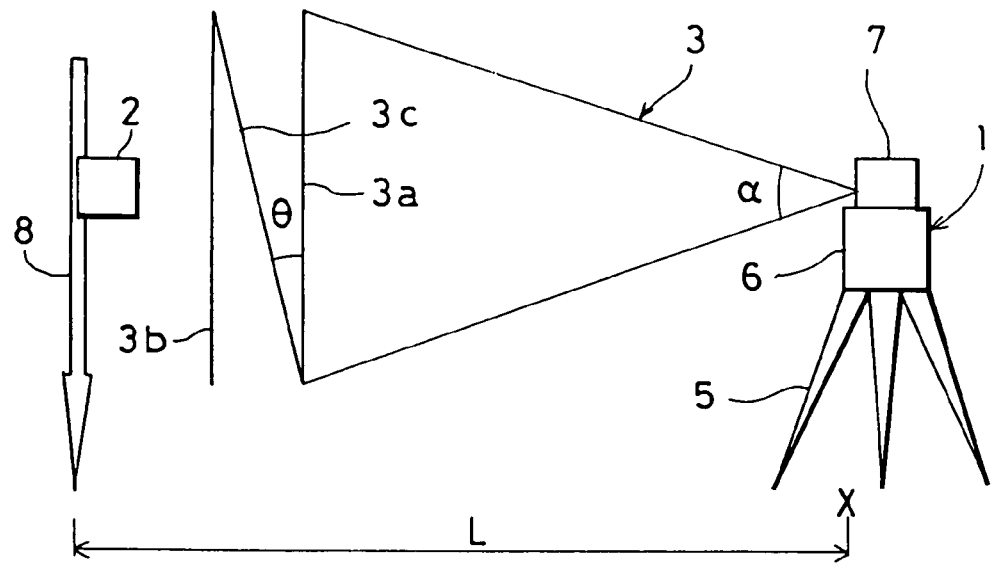
FIG. 1 is a schematical drawing of an embodiment of the present invention.

Description will be given below on the best aspect to carry out the present invention referring to the drawings.

First, description will be given on general features of a rotary laser system and a photodetection system used in the present embodiment referring to FIG. 1 to FIG. 3.

A rotary laser system 1 projects a plurality of fan-shaped laser beams by rotary irradiation. A photodetection system 2 comprises a photodetection unit 41 (to be described later). The photodetection unit 41 comprises at least one photodetector (in the figure, two photodetectors are shown), which receives the fan-shaped laser beams.

A tripod 5 is installed at a position to approximately align with an approximately known point X, and the rotary laser system 1 is mounted on the tripod 5. The rotary laser system 1 comprises a main unit 6 and a rotating unit 7 rotatably mounted on the main unit 6. A laser beam 3 is projected by rotary irradiation from the rotating unit 7. The photodetection system 2 is supported by a supporting means as required. FIG. 1 shows operating condition in outdoor conditions. The photodetection system 2 is installed on a rod 8, which can be manually handled by an operator.

The laser beam 3 comprises a plurality of fan-shaped beams (fan-shaped laser beams). For instance, the laser beam 3 is arranged in N-shaped configuration, comprising vertical fan-shaped beams 3a and 3b and a fan-shaped beam 3c tilted at an angle of θ on a diagonal line with respect to the fan-shaped beams 3a and 3b. Each of the fan-shaped beams 3a and 3b are projected with a spreading angle of α in a direction of ±δ (See FIG. 6). The fan-shaped beams 3a and 3b are not necessarily vertical in so far as the fan-shaped beams 3a and 3b are parallel to each other and cross a horizontal plane.

Figure 2:
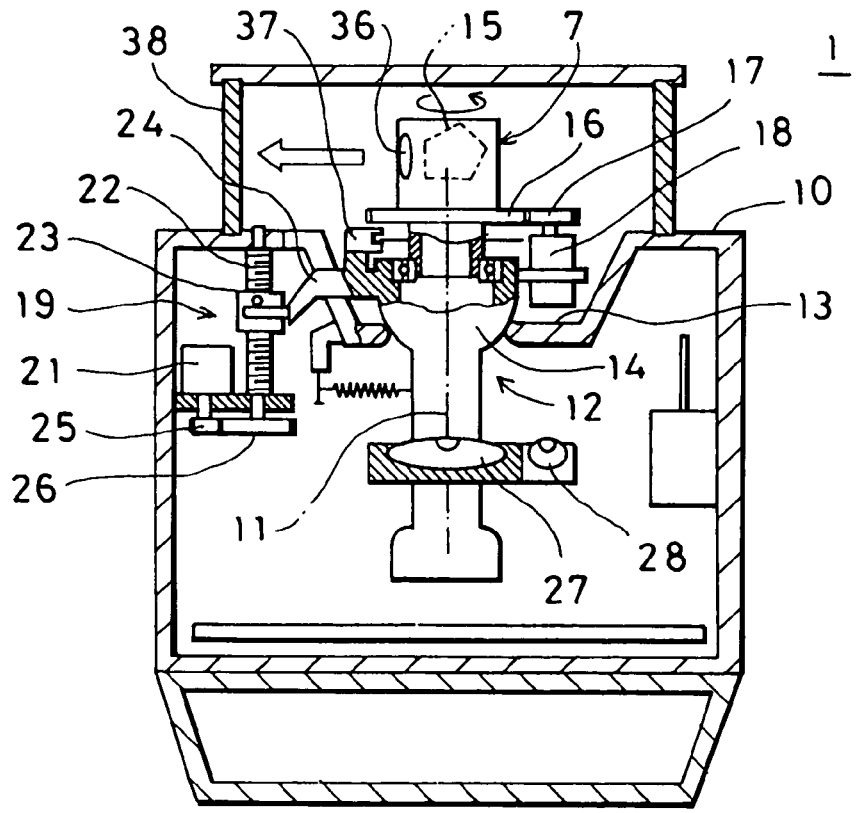
FIG. 2 is a cross-sectional view of a rotary laser system in the embodiment of the present invention.
Figure 3:
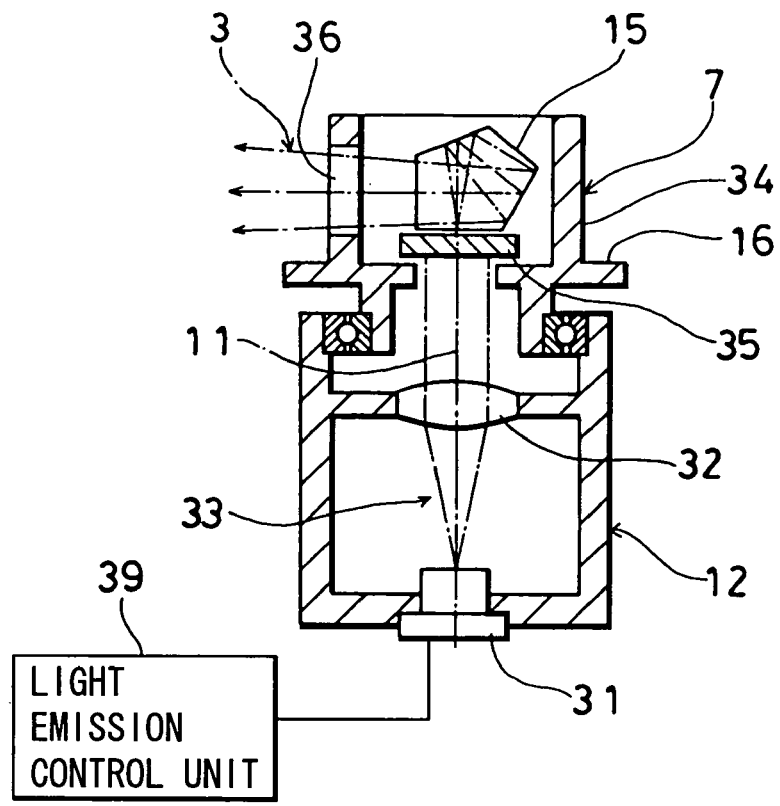
FIG. 3 is a cross-sectional view of a laser projector of the rotary laser system.

Referring to FIG. 2 and FIG. 3, description will be given on the rotary laser system 1.

The rotary laser system 1 according to the present invention comprises a casing 10 and a laser projector 12 having a projection optical axis 11 (to be described later). The laser projector 12 is tiltably accommodated in the casing 10.

A recessed portion 13 in truncated conical shape is formed at a center of an upper surface of the casing 10, and the laser projector 12 is penetrating through a center of the recessed portion 13 in an up-to-bottom direction. The laser projector 12 is supported on the recessed portion 13 via a spherical seat 14 so that the laser projector 12 can be tilted. On an upper portion of the laser projector 12, the rotating unit 7 is rotatably mounted, and a pentagonal prism 15 is provided on the rotating unit 7.

A scanning gear 16 is arranged on the rotating unit 7. The laser projector 12 is provided with a scanning motor 18 having a driving gear 17. The rotating unit 7 can be rotated and driven by the scanning motor 18 via the driving gear 17 and the scanning gear 16.

Two sets of tilting mechanisms 19 (only one of the tilting mechanisms 19 is shown in the figure), which are arranged around the laser projector 12, are accommodated within the casing 10. The tilting mechanism 19 comprises a motor for tilting 21, a screw for tilting 22 having a center of rotation in parallel to the laser projector 12, and a tilting nut 23 threaded on the screw for tilting 22.

The laser projector 12 comprises two tilting arms 24 (only one of the tilting arms 24 is shown in the figure), which are extended in a direction perpendicularly crossing the projection optical axis 11, and the tilting arms 24 perpendicularly cross each other. At a tip of each of the tilting arms 24, a pin with circular cross-section is protruded, and the tilting arm 24 is engaged with the tilting mechanism 19 via the pin.

The motor for tilting 21 can rotate the screw for tilting 22 via a driving gear 25 and a gear for tilting 26. When the screw for tilting 22 is rotated, the tilting nut 23 is moved up or down. When the tilting nut 23 is moved up or down, the tilting arm 24 is tilted, and the laser projector 12 is tilted. The other set of the tilting mechanism not shown in the figure tilts the laser projector 12 in a direction perpendicular to the tilting direction of the tilting mechanism 19 by a mechanism similar to the mechanism of the tilting mechanism 19.

On an intermediate portion of the laser projector 12, there are provided a fixed tilt sensor 27 in parallel to the tilting arm 24 and a fixed tilt sensor 28 in a direction perpendicular to the tilting arm 24. By the fixed tilt sensor 27 and the fixed tilt sensor 28, a tilt angle of the laser projector 12 in any direction can be detected. Based on the result of the detection by the fixed tilt sensor 27 and the fixed tilt sensor 28, the laser projector 12 is tilted by the two sets of the tilting mechanisms 19 via two tilting arms 24, and the laser projector 12 can be controlled so that the laser projector 12 is always maintained in a vertical direction. Also, the laser projector 12 can be tilted at any desired angle.

Referring to FIG. 3, description will be given now on the laser projector 12 and the rotating unit 7.

A projection optical system 33 comprises a laser beam emitting unit 31 and a collimator lens 32, etc. arranged along the projection optical axis 11, and the projection optical system 33 is accommodated in the laser projector 12.

The rotating unit 7 has a prism holder 34. The prism holder 34 holds the pentagonal prism 15 and a diffraction grating (BOE) 35 provided under the pentagonal prism 15.

The laser beam 3 emitted from the laser beam emitting unit 31 is turned to parallel beams by the collimator lens 32, and the laser beam 3 enter the diffraction grating 35. The incident laser beam 3 is divided so as to form three fan-shaped beams 3a, 3b, and 3c by the diffraction grating 35. The fan-shaped beams 3a, 3b and 3c are deflected in a horizontal direction by the pentagonal prism 15 and are projected through a projection window 36 of the prism holder 34.

The diffraction grating 35 may be arranged at a position where the laser beam 3 passes through after being deflected by the pentagonal prism 15. In FIG. 2, reference numeral 37 denotes an encoder for detecting a rotation angle of the rotating unit 7, and 38 denotes a transparent cover in cylindrical shape.

Light emitting condition of the laser beam emitting unit 31 is controlled by a light emission control unit 39. For instance, communication data can be superimposed on the laser beam 3 by a method, e.g. a method to modulate the laser beam 3. Thus, data such as positional information on the direction of rotary projection of the rotary laser system 1 detected by the encoder 37 can be sent to the photodetection system 2 via optical communication.

A wireless communication equipment may be separately provided as a communication means, and data may be transmitted to the photodetection system 2 via wireless communication.

Figure 4:
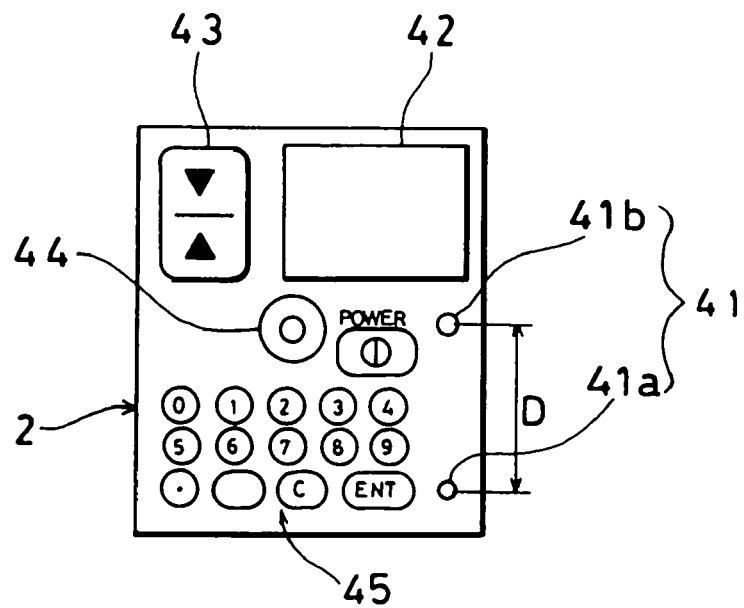
FIG. 4 is a front view of a photodetection system used in the embodiment of the present invention.
Figure 5:
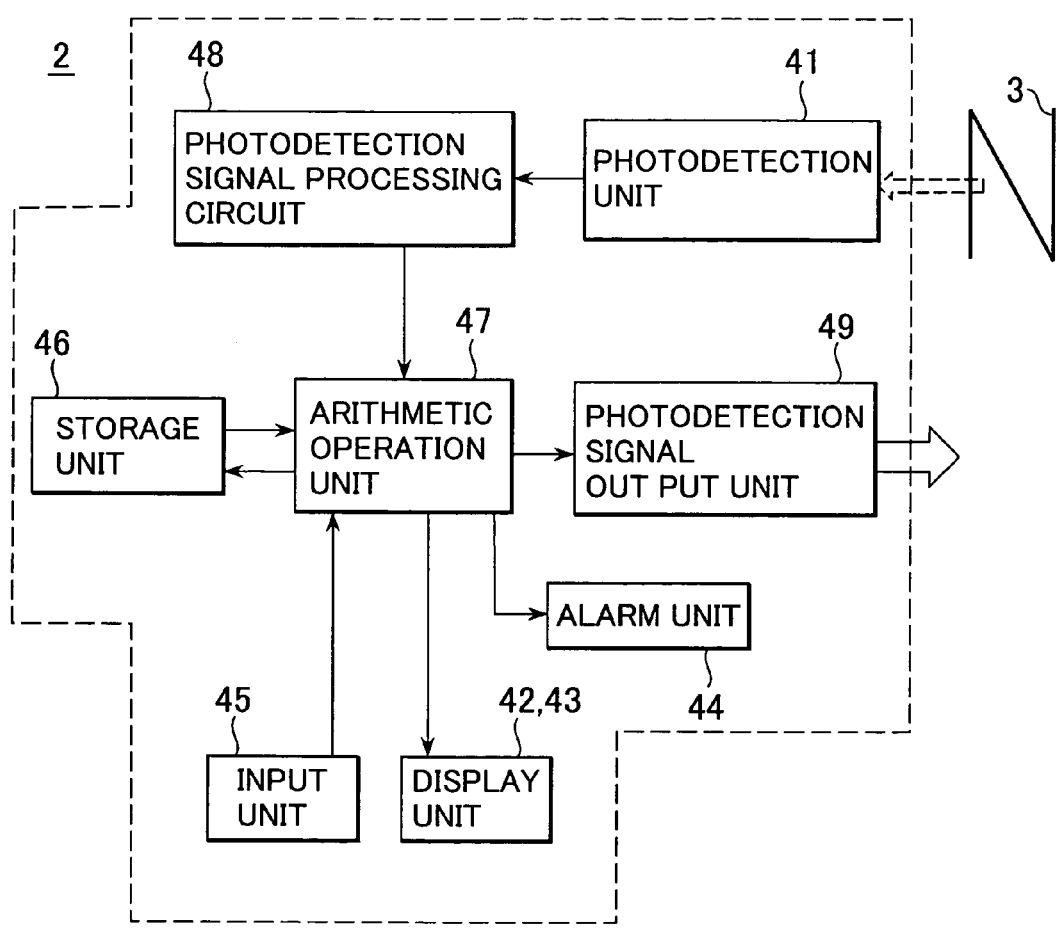
FIG. 5 is a schematical block diagram of the embodiment of the present invention.

Next, description will be given on the photodetection system 2 referring to FIG. 4 and FIG. 5.

The photodetection system 2 comprises a photodetection unit 41 for detecting the fan-shaped beams 3a, 3b and 3c, a display unit 42, a mark display unit 43, an alarm unit 44 such as a buzzer, and an input unit 45 such as input keys. The photodetection unit 41 comprises a plurality of, for instance, two photodetectors 41a and 41b arranged above and under, each comprising a light emitting element such as a laser diode. A distance D between the photodetector 41a and the photodetector 41b is a known value. Further, a storage unit 46, an arithmetic operation unit 47, a photodetection signal processing circuit 48, and a photodetection signal output unit 49 are incorporated in the photodetection system 2.

Figure 8:
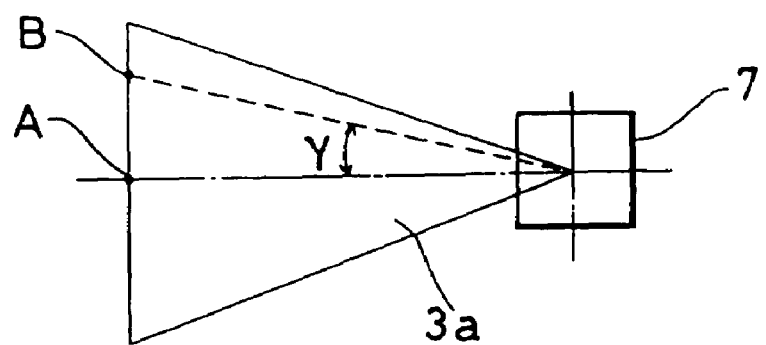
FIG. 8 is a side view to explain operation of the embodiment of the present invention.
Figure 9:
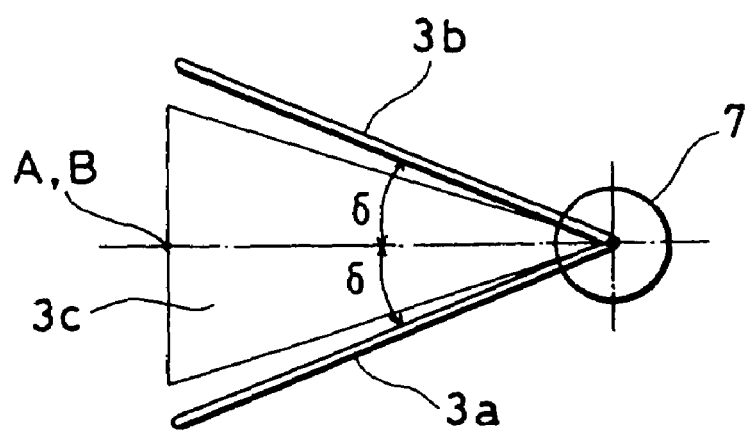
FIG. 9 is a plan view to explain operation of the embodiment of the present invention.

On the display unit 42, an angle (elevation angle $\gamma$ (See FIG. 8)) formed by a straight line, which connects a center point of rotation of the laser beam 3 with the photodetector 41, and a horizontal reference plane is displayed, and a distance between the photodetection system 2 and the rotary laser system 1 is also displayed. The mark display unit 43 comprises marks, i.e. a central line and triangles, which are arranged at symmetrical positions with respect to the central line. The central line is lighted up when scanning position of the laser beam 3 is at the center of the horizontal line. When a scanning position of the laser beam 3 is above or under the center of the horizontal line, a corresponding mark is lighted up.

In the storage unit 46, there are provided calculation programs necessary for surveying operation such as a program to calculate the elevation angle $\gamma$ (to be described later) based on a signal from the photodetection unit 41, a program to calculate a distance between the rotary laser system 1 and the photodetection system 2, and a program to identify position of the rotary laser system 1.

When the fan-shaped beams 3a, 3b and 3c are received, a photodetection signal from the photodetection unit 41 is inputted to the photodetection signal processing circuit 48, and it is detected whether the light has been received or not. Required signal processing such as A/D conversion is performed, and communication data superimposed on the fan-shaped beams 3a, 3b and 3c are extracted and analyzed, and the results are inputted to the arithmetic operation unit 47. As to be described later, the arithmetic operation unit 47 calculates the elevation angle $\gamma$ based on the signal from the photodetection signal processing circuit 48. Further, based on positional relation between the photodetectors 41a and 41b, a distance L between the rotary laser system 1 and the photodetection system 2 and tilting of the rod 8 is calculated. Further, the arithmetic operation unit 47 inputs the calculation results to the storage unit 46 and the results are displayed on the display unit 42. Also, calculation results are transmitted to the rotary laser system 1 by optical communication via the photodetection signal output unit 49.

Positional information of a point such as the known point X may be inputted in advance to the storage unit 46 by the input unit 45. When the rotary laser system 1 has a wireless communication equipment as a communication means, a wireless receiver is provided on the photodetection system 2.

The results of the calculation by the arithmetic operation unit 47 are outputted by the photodetection signal output unit 49. An output from the photodetection signal output unit 49 is used as a signal to drive the mark display unit 43.

Now, such calculations in the photodetection system 2 are described below as calculation of a distance between the rotary laser system 1 and the rod 8, and calculation of a height of the photodetection system 2 and the like.

The rotary laser system 1 is installed via the tripod 5 at a predetermined point. Based on the results of detection by the fixed tilt sensors 27 and 28, the tilting mechanism 19 is driven, and adjustment is made so that the laser projector 12 is maintained at vertical position.

The rod 8 is set at a measuring point. The photodetection system 2 is mounted at a predetermined height on the rod 8, i.e. at a known height from the ground surface. Therefore, a distance between the lower end of the rod 8 and the photodetector 41a is already known. The distance D between the photodetectors 41a and 41b and the distance between the lower end of the rod 8 and the photodetector 41a are inputted to the photodetection system 2 by the input unit 45. The data such as the distance D are stored in the storage unit 46 via the arithmetic operation unit 47.

A height of the photodetection system 2, i.e. a difference of height of the photodetectors 41a and 41b with respect to the horizontal reference plane, a distance L between the rotary laser system 1 and the photodetection system 2, and elevation angles $\gamma1$ and $\gamma2$ with respect to the photodetectors 41a and 41b are calculated based on the receiving condition of the photodetection signals of the photodetectors 41a and 41b and based on the distance D.

The elevation angles $\gamma1$ and $\gamma2$ are calculated by the arithmetic operation unit 47 based on photodetection signals emitted when the photodetectors 41a and 41b respectively receive the fan-shaped beams 3a, 3b and 3c. When the photodetection unit 41 is deviated from a photodetection range of the laser beam 3 or the like, the alarm unit 44 issues buzzer, etc. to attract the attention of the operator.

Figure 6:
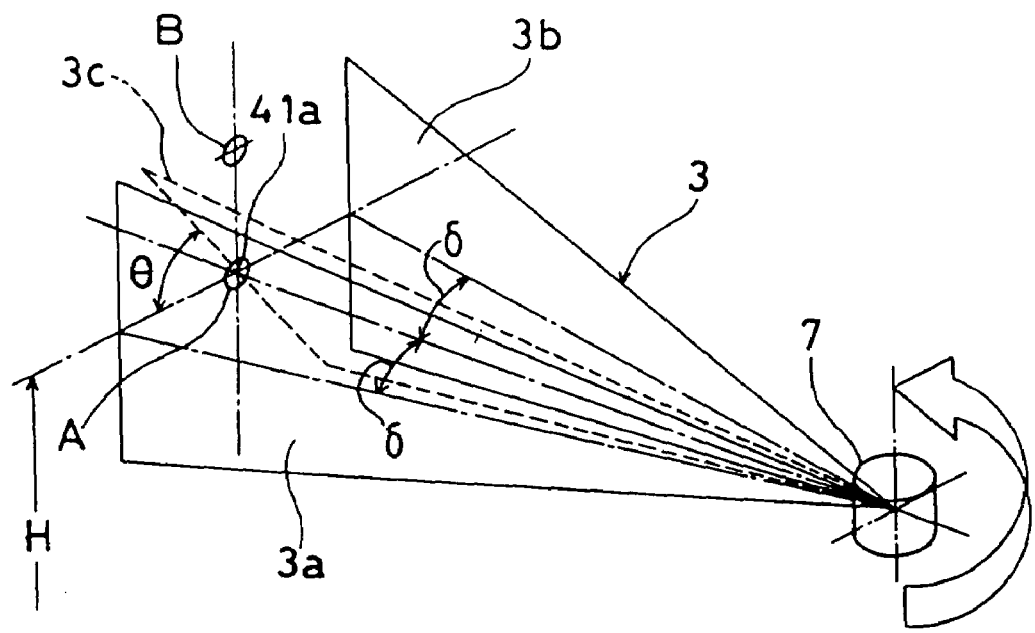
FIG. 6 is a perspective view to explain operation of the embodiment of the present invention.
Figure 7:
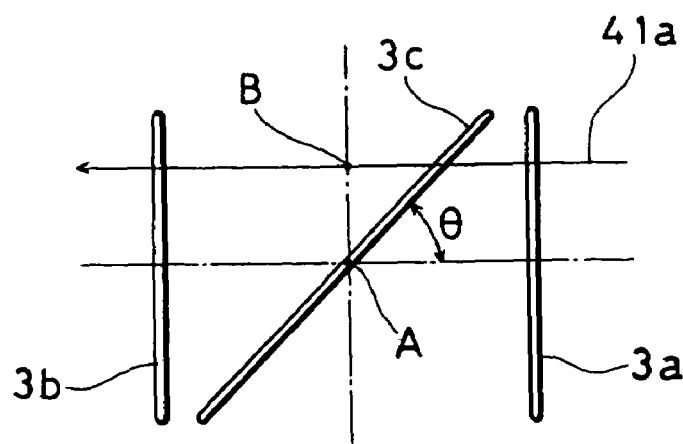
FIG. 7 is a front view to explain operation of the embodiment of the present invention.

Now, description will be given on the elevation angle $\gamma$ and the height difference with respect to the horizontal reference plane at the position of the photodetection system 2 referring to FIG. 6. FIG. 6 shows the relation between the photodetector 41 and the laser beam 3. The height H represents a height of the reference plane, i.e. a height of the center of the laser beam 3. In other words, the height H is the height to the horizontal line.

The laser beam 3 is projected by rotary irradiation, and the laser beam 3 crosses the photodetection unit 41, e.g. the photodetector 41a. Because the laser beam 3 comprises the fan-shaped beams 3a, 3b and 3c, photodetection can be performed even when the photodetector 41a is a spot-like photodetection element, and there is no need to perform accurate positioning of the photodetection system 2.

When the laser beam 3 crosses over the photodetector 41a, each of the fan-shaped beams 3a, 3b and 3c passes through the photodetector 41a. From the photodetector 41a, photodetection signals 51a, 51b and 51c corresponding to the fan-shaped beams 3a, 3b and 3c respectively are issued.

Figure 10A:
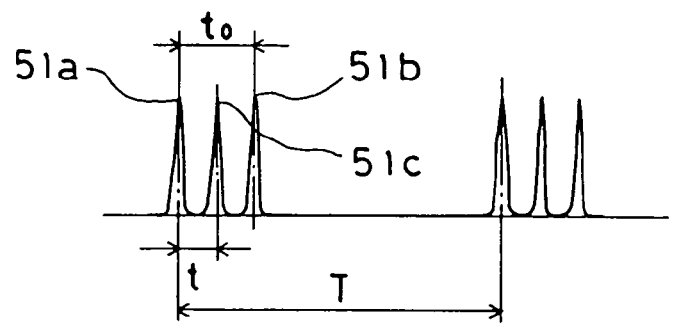
FIG. 10(A) and FIG. 10(B) each represents a diagram to show a photodetection signal of the photodetection system.

When the photodetector 41a is at a position of a point A as shown in FIG. 6 to FIG. 9 with respect to the laser beam 3, i.e. when the photodetector 41a is at the center of the laser beam 3, the photodetection signal is as shown in FIG. 10(A), and a time interval "t" between two each of three photodetection signals 51a, 51c and 51b is equal to each other (=$t_0/2$). The rotating unit 7 is driven by at a constant rotation speed. In the figure, the symbol T represents a period, during which the laser beam 3 is rotated by one turn.

Figure 10B:
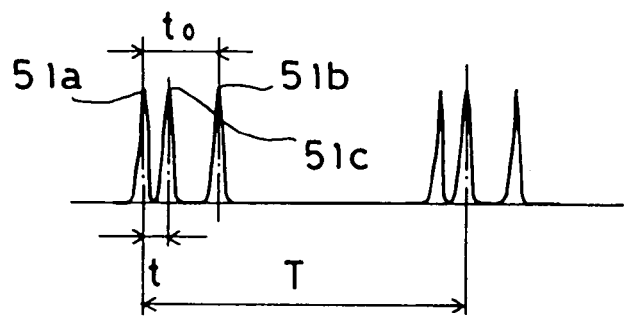

When the photodetector 41a is deviated from the center of the laser beam 3 and is at a position of a point B shown in FIG. 6 to FIG. 9, the time interval between two each of the photodetection signals 51a, 51c and 51b is different (FIG. 10(B)). When it is assumed that the photodetector 41a is relatively moved from the right to the left in FIG. 7 (i.e. the laser beam 3 moves from the left to the right in the figure), the time interval "t" between the photodetection signal 51a and the photodetection signal 51c becomes shorter, and the interval between the photodetection signal 51c and the photodetection signal 51b becomes longer.

The shapes formed by the laser beam 3 in FIG. 6 are similar to each other regardless of the distance between the photodetection system 2 and the rotating unit 7. By determining the ratio of the time intervals, a light-passing position in the figure can be calculated in the figure, which is turned to dimensionless. Therefore, regarding to the photodetector 41a, the elevation angle γ1 to the position of the point B with the rotating unit 7 at the center can be calculated according to the equation (1).

$$\gamma 1 = \delta(1 - 2t1/t0)\tan\theta \quad (1)$$

Similarly, the elevation angle γ2 of the photodetector 41b can be calculated by the equation (2).

$$\gamma 2 = \delta(1 - 2t2/t0)\tan\theta \quad (2)$$

Further, based on the elevation angles γ1 and γ2 and on the distance D, the distance L between the rotary laser system 1 and the photodetection system 2 can be calculated by the equations given below.

Figure 11:
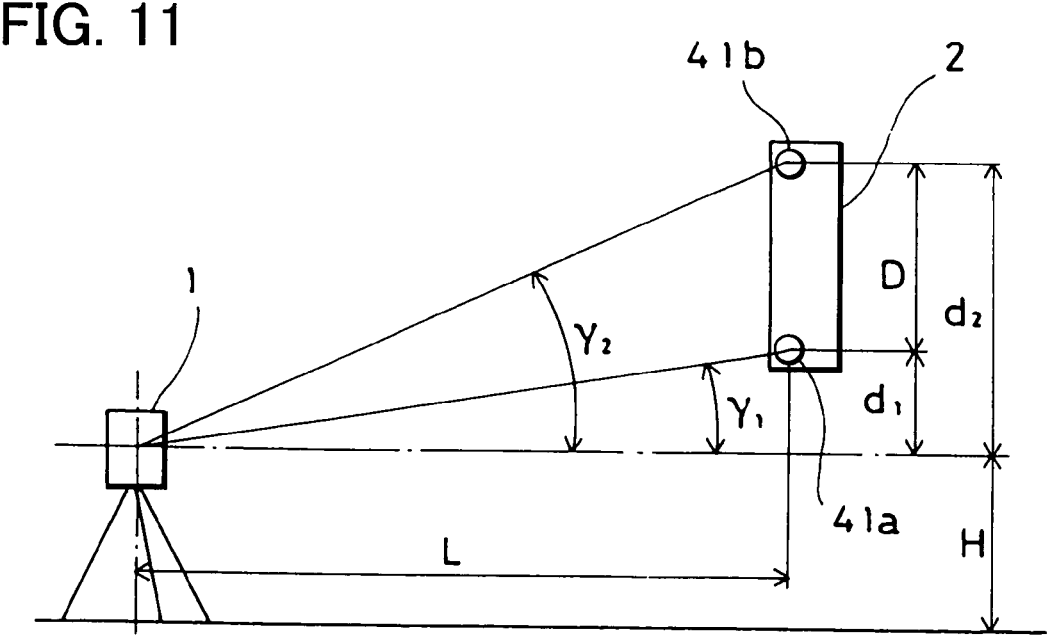
FIG. 11 is a drawing to explain distance measurement in the embodiment of the present invention.

Description will be given below on calculation of the distance L referring to FIG. 11.

Here, it is supposed that a distance from the horizontal position to the photodetector 41a is d1, and a distance from the horizontal position to the photodetector 41b is d2. Then, the distance L can be calculated from the following equations:

$$d1 = L\tan(\gamma 1) \quad (3)$$

$$d2 = L\tan(\gamma 2) \quad (4)$$

$$D + d1 = d2 \quad (5)$$

Therefore, $$L = D/(\tan(\gamma 2) - \tan(\gamma 1)) \quad (6)$$

When the distance L is obtained, height differences d1 and d2 up to the photodetectors 41a and 41b respectively can be calculated by the equations (3) and (4).

As described above, when the laser beam 3 is projected by rotary irradiation at a constant speed, the laser beam 3 comprising a plurality of fan-shaped beams (fan-shaped laser beams) (e.g. the laser beam 3 comprises vertical fans-shaped beams 3a and 3b and a fan-shaped beam 3c tilted at an angle of θ on a diagonal line with respect to the fan-shaped beams 3a and 3b, thus being arranged in N-shaped configuration), and when the laser beam 3 is received by the photodetection system 2, it is possible to determine the distance between the rotary laser system 1 and the photodetection system 2, the values of heights d1 and d2 of the photodetection system 2, and the elevation angle γ.

Therefore, because the position of installation of the rotary laser system 1 is already known, measurement on the photodetection system 2 can be made.

Figure 12:
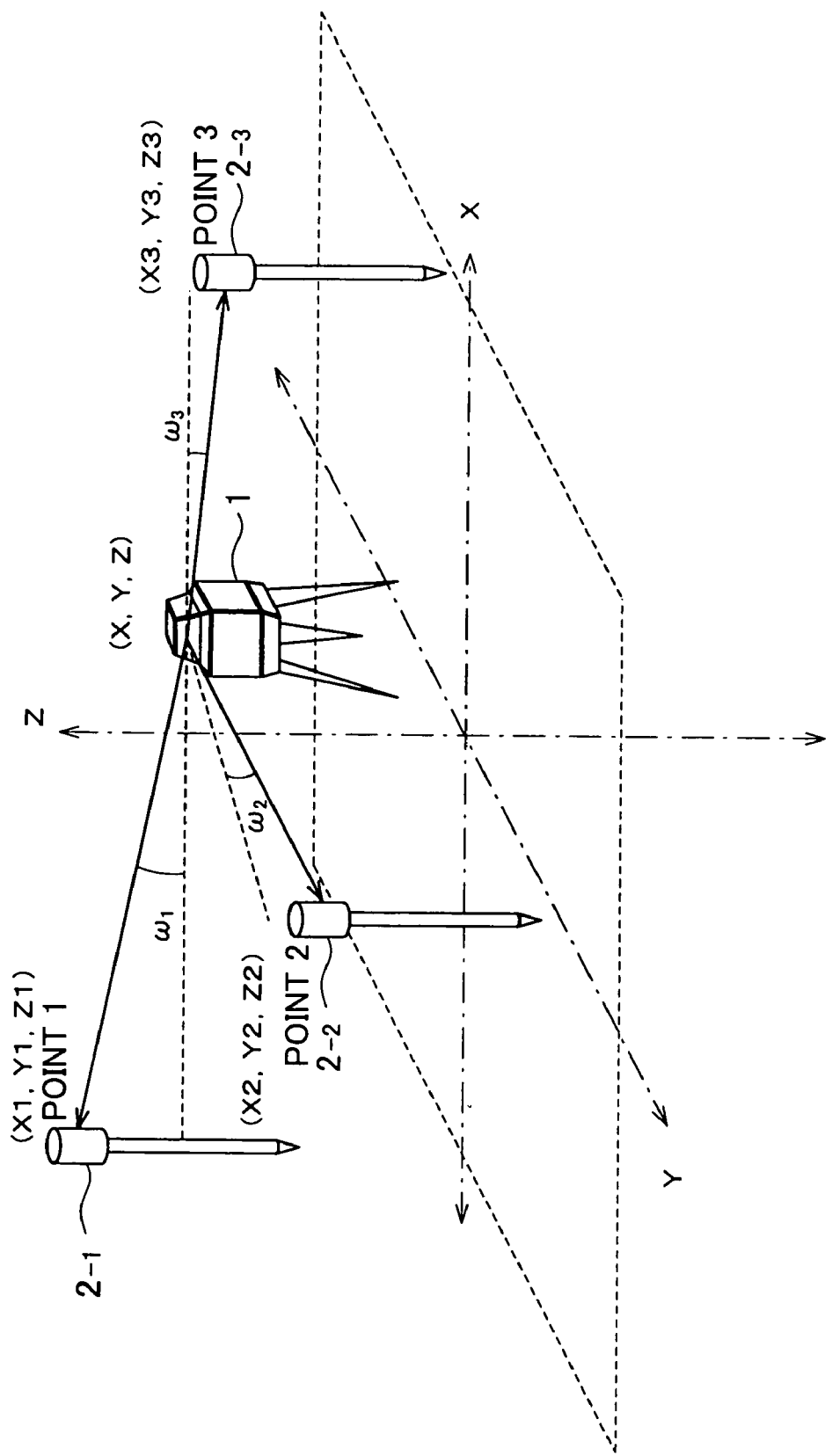
FIG. 12 is a drawing to explain operation of the embodiment of the present invention.

Next, description will be given on operation when the rotary laser system 1 is installed referring to FIG. 12.

As described above, when the photodetection system 2 comprises at least one photodetector 41, the elevation angle γ can be measured. Further, by installing the photodetection system 2 at a known point, 3-dimensional coordinates (x, y, z) can be obtained from a single photodetection system 2 or from the photodetection system 2 installed at one point, and the elevation angle ω between the rotary laser system 1 and the photodetection system 2 can be obtained. The known point is defined as a point, which has been measured and installed in advance and which is obtained by surveying operation each time, etc.

When the rotary laser system 1 is installed at a predetermined point (X, Y, Z) and at least three photodetection systems 2 are installed at known points or the photodetection systems 2 are sequentially installed at three known points, it is possible to obtain coordinate values and elevation angles at the three known points, i.e. (x1, y1, z1, ω1), (x2, y2, z2, ω2) and (x3, y3, z3, ω3). Data of these three known values of coordinates and elevation angles are transmitted to the rotary laser system 1, or these data are collected at the predetermined photodetection system 2 via the rotary laser system 1.

The coordinate (unknown point) where the rotary laser system 1 is installed can be obtained from the three known coordinate values and the elevation angles by the equations given below.

$$(X - x1)^2 + (Y - y1)^2 = [(Z - z1)/\tan\omega 1]^2$$

$$(X - x2)^2 + (Y - y2)^2 = [(Z - z2)/\tan\omega 2]^2$$

$$(X - x3)^2 + (Y - y3)^2 = [(Z - z3)/\tan\omega 3]^2$$

As a result, coordinates of the installation point of the rotary laser system 1 can be accurately determined. Subsequently, it is possible to perform measurement by installing the photodetection system 2 at any desired point.

Surveying operation can be performed without installing the rotary laser system 1 at a known point, and the installing position of the rotary laser system 1 can be confirmed. If there may be an error, it can be corrected.

When the values of coordinates and elevation angles, i.e. (x1, y1, z1, ω1), (x2, y2, z2, ω2) and (x3, y3, z3, ω3) can be determined at three points on the photodetection system 2 respectively, it is possible to calculate the installing position of the rotary laser system 1 on the photodetection system 2. Thus, the operation of the rotary laser system 1 can be limited only to the projection of the laser beam by rotary irradiation.

If there is communication function between the rotary laser system 1 and the photodetection system 2, the installing position of the rotary laser system 1 can be calculated either at the arithmetic operation unit on the rotary laser system 1 or on the arithmetic operation unit of the photodetection system 2. By installing the photodetection system 2 at three or more known points and obtaining the installing position of the rotary laser 1 can be determined with higher accuracy, the accuracy can be increased.

Figure 13:
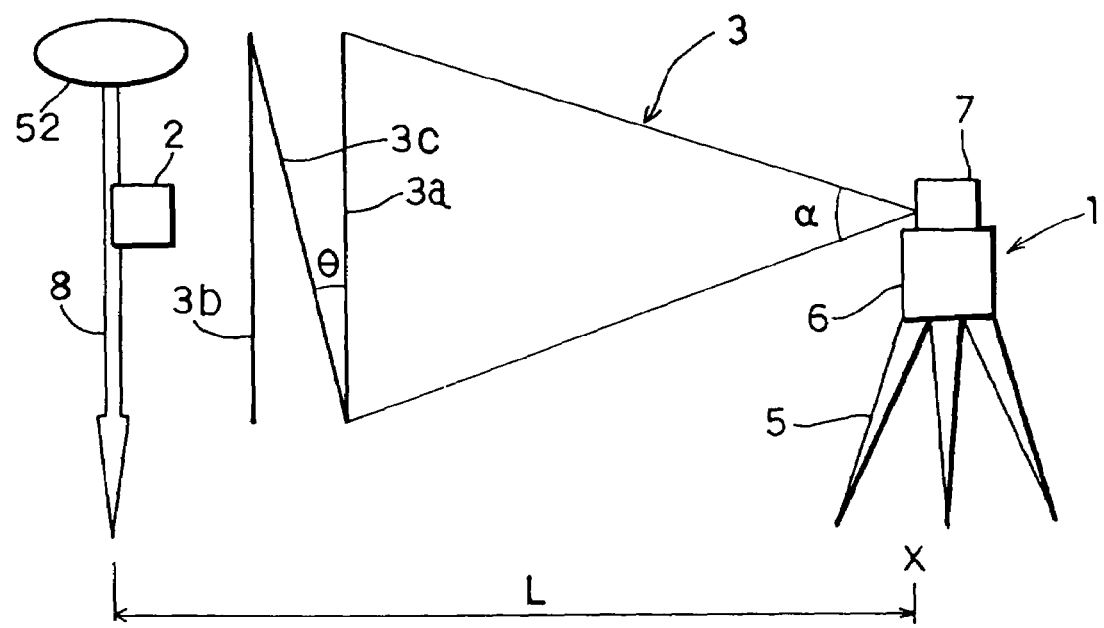
FIG. 13 is a schematical drawing to show another embodiment of the present invention.

FIG. 13 shows a case where the photodetection system 2 is provided with a GPS position measuring system 52.

The GPS position measuring system 52 may be provided on the photodetection system 2. The GPS position measuring system 52 is installed, for instance, on an upper end of the rod 8, and a distance between the GPS position measuring system 52 and the lower end of the rod 8 is already known. By providing the GPS position measuring system 52, an absolute plane position of the GPS position measuring system 52 can be measured. From the position measured by the GPS position measuring system 52 and the position of the known point where the rotary laser system 1 is installed, a distance between the photodetection system 2 and the rotary laser system 1 can be calculated. Further, the tilting of the rod 8 can be measured by the photodetection system 2. Because the distance between the lower end of the rod 8 and the GPS position measuring system 52 is already known, an error caused from the tilting of the rod 8 can be corrected, and this makes it possible to measure the distance with high accuracy.

When the photodetection system 2 is provided with the GPS position measuring system 52, there is no need to install the photodetection system 2 at a known point when the installing position of the rotary laser system 1 is to be measured. Because the result of measurement from the GPS position measuring system 52 is obtained, the condition equivalent to the condition where the photodetection system 2 is installed at a known point can be obtained. Thus, the installing position of the rotary laser system 1 can be accurately calculated.

As described above, if the photodetection system 2 is provided with two photodetectors 41, a distance between the rotary laser system 1 and the photodetection system 2 can be measured. Because the projecting direction can be identified by the encoder 37, it would suffice if installing position of the photodetection system 2 is known at least at one point.

The configuration of a plurality of the fan-shaped beams may not be an N-shaped configuration. It would suffice if at least one of the fan-shaped beams is tilted and the values about configurations such as a tilt angle are already known. For instance, the configurations shown in FIG. (A) to FIG. 14(R) or the like may be used.

What is claimed is:

1. A laser measuring method in a laser measuring system, which comprises a rotary laser system for projecting a laser beam by rotary irradiation and at least one photodetection system having at least one photodetector for receiving the laser beam, comprising a step of emitting at least two fan-shaped laser beams by said rotary laser system, at least one of the fan-shaped laser beams being tilted, a step of receiving said laser beams at least at three known points by said photodetection system, a step of obtaining elevation angles with respect to said rotary laser system based on photodetection signals which are formed when said photodetector receives the laser beam, and a step of measuring an installing position of said rotary laser system based on elevation angles and position data at the three known points.

2. A laser measuring system, comprising a rotary laser system for projecting a laser beam by rotary irradiation and at least one photodetection system for receiving the laser beam, wherein said rotary laser system has a laser projector for emitting at least two fan-shaped laser beams, at least one of the fan-shaped laser beams being tilted, said photodetection system comprises at least one photodetector for receiving said fan-shaped laser beams, said photodetection system is installed at least at three known points, elevation angles with respect to said rotary laser system are calculated based on photodetection signals which are formed when said photodetector receives the laser beam, and an installing position of said rotary laser system is calculated based on elevation angles and position data at the three known points.

3. A laser measuring system according to claim 2, wherein said photodetection system comprises a GPS position measuring system, and a position of said photodetection system is measured by said GPS position measuring system.

* * * * *